(12) United States Patent
Drago et al.

(10) Patent No.: US 7,884,702 B2
(45) Date of Patent: Feb. 8, 2011

(54) QUEUED OPERATIONS IN HF/UHF RFID APPLICATIONS

(75) Inventors: Randall Allen Drago, Gaithersburg, MD (US); Omid Roshan-Afshar, Herndon, VA (US); Theodore Hockey, Mount Airy, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 279 days.

(21) Appl. No.: 11/956,602

(22) Filed: Dec. 14, 2007

(65) Prior Publication Data

US 2008/0165007 A1 Jul. 10, 2008

Related U.S. Application Data

(60) Provisional application No. 60/874,718, filed on Dec. 14, 2006.

(51) Int. Cl.
*H04Q 5/22* (2006.01)
(52) U.S. Cl. .................. 340/10.5; 340/572.1; 340/10.1
(58) Field of Classification Search ............. 340/572.1, 340/10.1, 505
See application file for complete search history.

(56) References Cited

U.S. PATENT DOCUMENTS 6,034,603 A * 3/2000 Steeves ..................... 340/10.2

2004/0178886 A1 * 9/2004 Watanabe et al. .......... 340/10.1

FOREIGN PATENT DOCUMENTS

| DE | 198 15 300 A1 | 4/1998 |
| EP | 0 709 803 A2 | 5/1996 |
| EP | 1 321 889 A2 | 6/2003 |

OTHER PUBLICATIONS

International Search Report issued in International Application No. PCT/US2007/087603, mailed May 14, 2008.

* cited by examiner

*Primary Examiner*—Travis R Hunnings
(74) *Attorney, Agent, or Firm*—Glenn Frankenberger; Terri S. Hughes

(57) ABSTRACT

A method for pipelined processing of access commands to a population of radio frequency identification (RFID) tags is provided. The method includes transmitting a first queued access command to a first tag in the population of RFID tags, transmitting a second queued access command to a second tag in the population of RFID tags, and transmitting a status request command to the first tag. The queued access command causes the first tag to perform an operation and upon completion of the operation, to suspend transaction processing. The second queued access command is transmitted while the first tag is performing the command operation. The status request command causes the first tag to resume normal processing.

21 Claims, 11 Drawing Sheets

|  | Command Name | MemBank | WordPtr | Data | RN | CRC-16 |
|---|---|---|---|---|---|---|
| # of Bits | 8 | 2 | EBV | 16 | 16 | 16 |
| description | Queued_Write | 00: Reserved<br>01: EPC<br>10: TID<br>11: User | Address pointer | Random number exclusive OR'd with word to be written | handle | |

FIG. 7A

|  | Command Name | MemBank | WordPtr | Word Count | Data | RN | CRC-16 |
|---|---|---|---|---|---|---|---|
| # of Bits | 8 | 2 | EBV | 8 | 16 | 16 | 16 |
| description | Queued_BlockWrite | 00: Reserved<br>01: EPC<br>10: TID<br>11: User | Starting address pointer | Number of words to write | Data to be written | handle | |

FIG. 7B

|  | Command Name | MemBank | WordPtr | Word Count | RN | CRC-16 |
|---|---|---|---|---|---|---|
| # of Bits | 8 | 2 | EBV | 8 | 16 | 16 |
| description | Queued_BlockErase | 00: Reserved<br>01: EPC<br>10: TID<br>11: User | Starting address pointer | Number of words to erase | handle | |

FIG. 7C

QUEUED OPERATIONS IN HF/UHF RFID APPLICATIONS

CROSS REFERENCE TO RELATED APPLICATIONS

This application claims the benefit of U.S. Provisional Appl. No. 60/874,718, filed Dec. 14, 2006, which is incorporated by reference herein in its entirety.

BACKGROUND OF THE INVENTION

1. Field of the Invention

The present invention relates generally to radio frequency identification (RFID), and more particularly to methods, systems and apparatus for writing data to RFID tags.

2. Background

Radio frequency identification (RFID) systems generally include at least one interrogator (reader) that communicates with at least one RFID tag using radio frequency (RF) signals. Each tag stores data that may include common information and unique identification (ID) information. A tag may be associated with a single item or unit of items (e.g., a skid, box, cargo container, truck, or the like), where the RFID tag data provides information about the item or unit of items. A tag may also be associated with an individual or an animal. An interrogator (reader) communicates with one or a plurality of RFID tags to read RFID tag data or a portion of the tag data, or to write data to a tag. In this manner, it is possible to non-invasively perform various functions, such as identifying, detecting, sorting and tracking an item, monitoring inventory, preventing sale of out-of-date or potentially damaged stock, preventing unauthorized entry, exit or removal from a warehouse, store or other designated location, and the like.

The process of writing data to RFID tags follows a specific sequence. For example, in the Class 1, Generation 2 (Gen-2) standard, an interrogator issues a Write command and then transmits a continuous wave (CW) signal for a predefined time period (e.g., either 20 ms or the time between the Write command and the tag's backscattered reply). A tag may reply with an acknowledgement that the write completely successfully or an error code. If the interrogator does not receive a reply within a predefined period (e.g., 20 ms), the interrogator may reissue the Write command. Current Gen-2 tag designs effectively "drop out" and ignore further commands during the CW portion of the Write sequence.

The Write sequence described above has several performance limitations, particularly when writing data to a large population of tags. Passive RFID tags utilizing the EPC Global Gen2 standard typically require up to 20 mS per word written in order to perform a store operation into non-volatile memory before reporting status to the Interrogator. As discussed above, the interrogator waits for a response to the issued Write command that includes status information relevant to the write operation before transmitting the next command. For large groups of tags, this process becomes time consuming because of the time required to process the Write command at each tag, particularly compared to the time required to actually transmit the command. This presents a performance bottleneck for some applications writing data to a large population of tags. These applications could benefit from a faster overall write access time.

What is needed are methods and systems for increasing the performance of write operations, particularly to large tag populations.

BRIEF DESCRIPTION OF THE DRAWINGS/FIGURES

The accompanying drawings, which are incorporated herein and form a part of the specification, illustrate exemplary embodiments of the present invention and, together with the written description, further serve to explain the principles of the invention and to enable a person skilled in the art to make and use the invention.

FIG. 1 schematically illustrates an exemplary RFID system.

FIG. 2 schematically illustrates a block diagram of an exemplary RFID reader.

FIG. 3 schematically illustrates a plan view of an exemplary RFID tag.

FIG. 4 schematically illustrates a logical memory map of an exemplary RFID tag memory.

FIGS. 7A-7C depict exemplary formats for queued access commands, according to embodiments of the present invention.

Figure 1:
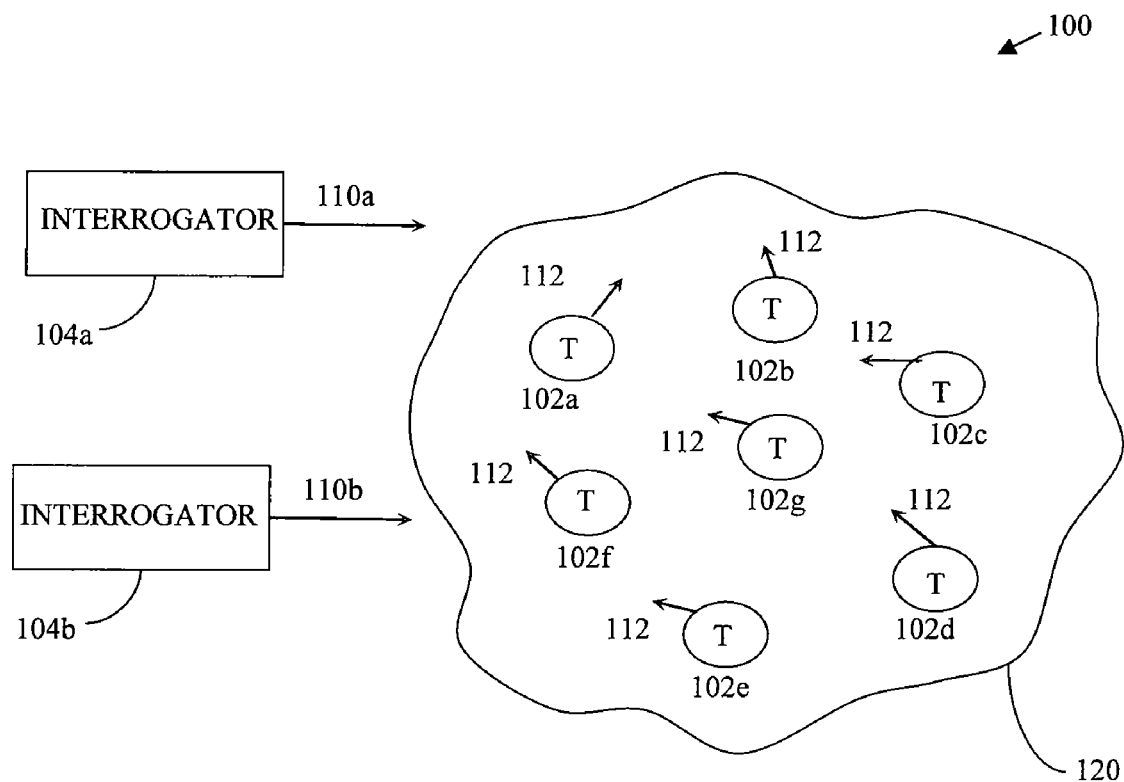

Exemplary embodiments of the present invention will be described with reference to the accompanying drawings, wherein like numbers designate like or similar elements or features, and like numbers having different lower case letters represent corresponding elements/features. The drawing in which an element first appears typically is indicated by the leftmost digit in the corresponding reference number.

DETAILED DESCRIPTION OF EMBODIMENTS

Introduction

The present specification discloses one or more embodiments that incorporate features of the claimed invention. The disclosed embodiment(s) merely exemplify the claimed invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Before describing embodiments of the present invention in detail, it is helpful to describe an example RFID communications environment in which the invention may be implemented. FIG. 1 illustrates an environment 100 where a RFID tag interrogator 104 communicates with an exemplary population 120 of RFID tags 102. As shown in FIG. 1, the population 120 of tags includes seven tags 102a-102g. A population 120 may include any number of tags 102.

Environment 100 includes one or more interrogators 104 (interrogators 104a and 104b are shown). An interrogator 104 may be requested by an external application to address the population of tags 120. Alternatively, interrogator 104 may have internal logic that initiates communication, or may have a trigger mechanism that an operator of interrogator 104 uses to initiate communication.

As shown in FIG. 1, interrogator 104 transmits an interrogation signal 110 having a carrier frequency to the population of tags 120. Interrogator 104 operates in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogator 104, including by alternatively reflecting and absorbing portions of signal 110 according to a time-based pattern or frequency. This technique for alternatively absorbing and reflecting signal 110 is referred to herein as backscatter modulation. Interrogators 104 receive and obtain data from response signals 112, including but not limited to an identification number of the responding tag 102. In the embodiments described herein, a reader may be capable of communicating with tags 102 according to any suitable communication protocol, including binary traversal protocols, slotted aloha protocols, Class 0, Class 1, EPC Gen 2, any others mentioned elsewhere herein, and future communication protocols.

Figure 2:
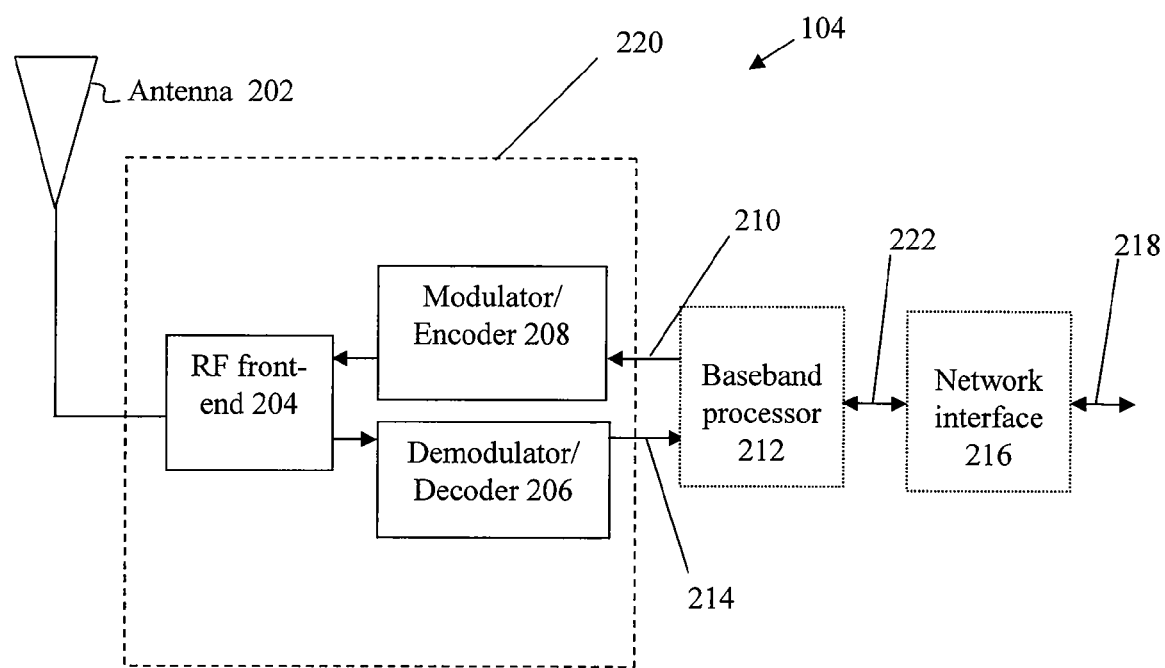

FIG. 2 shows a block diagram of an example RFID interrogator 104. Interrogator 104 includes one or more antennas 202, a receiver and transmitter portion 220 (also referred to as transceiver 220), a baseband processor 212, and a network interface 216. These components of interrogator 104 may include software, hardware, and/or firmware, or any combination thereof, for performing their functions. Interrogator 104 may broadcast (transmit) an RF signal to a broadcast field of the interrogator 104. A broadcast field (coverage or coverage pattern) of a reader 104 may vary in shape and/or size; generally, a broadcast field is determined by the transmit power of a transceiver 220 and gain pattern of a antenna 202. Also coverage of different antennas 202 may overlap. Those skilled in the art readily will be able to select appropriate transceiver(s) 220 and antenna(s) 202 to provide a suitable broadcast field (coverage or coverage pattern) for a desired application.

Baseband processor 212 and network interface 216 are optionally present in interrogator 104. Baseband processor 212 may be present in interrogator 104, or may be located remote from interrogator 104. For example, in an embodiment, network interface 216 may be present in interrogator 104, to communicate between transceiver portion 220 and a remote server that includes baseband processor 212. When baseband processor 212 is present in interrogator 104, network interface 216 may be optionally present to communicate between baseband processor 212 and a remote server. In another embodiment, network interface 216 is not present in interrogator 104.

In an embodiment, reader 104 includes network interface 216 to interface interrogator 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Interrogator 104 has at least one antenna 202 for communicating with tags 102 and/or other readers 104. Antenna(s) 202 may be any type of interrogator antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation or write request by interrogator 104. For example, an interrogation or write request may be initiated by a remote computer system/server that communicates with reader 104 over communications network 218. Alternatively, interrogator 104 may include a finger-trigger mechanism, a keyboard, a graphical user interface (GUI), and/or a voice activated mechanism with which a user of interrogator 104 may interact to initiate an interrogation or write operation by interrogator 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation or write request 210, and is coupled to an input of RF front-end 204. Modulator/encoder 208 encodes interrogation or write request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

Figure 3:
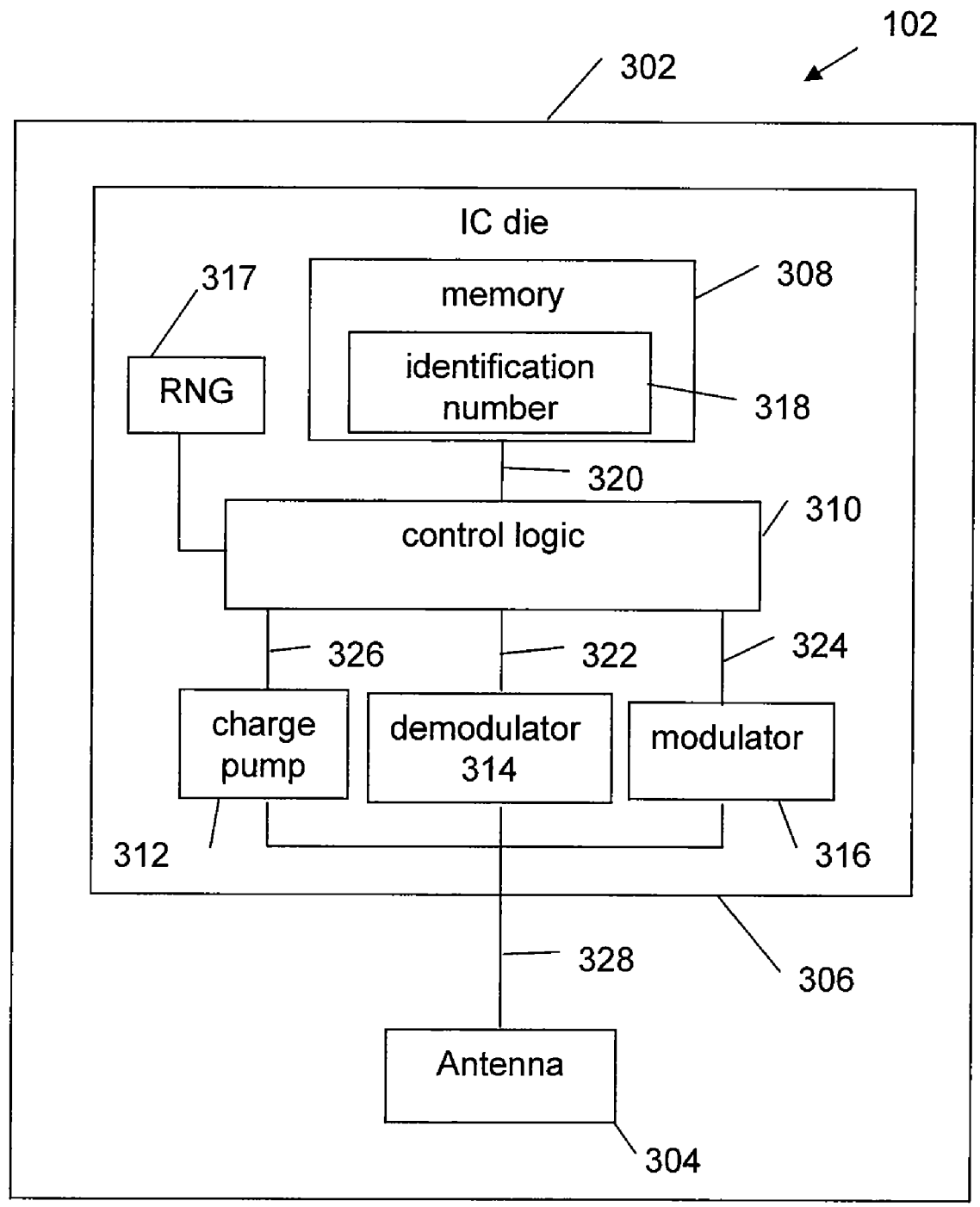

Tag 102 may be active, passive, or a combination of active and passive (referred to as pass-active). FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID interrogators using antenna 304. In the example embodiment of FIG. 3, IC 306 includes a memory 308, a control logic 310, a charge pump 312, a demodulator 314, a modulator 316, and a random number generator 317. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but alternatively may be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Figure 4:
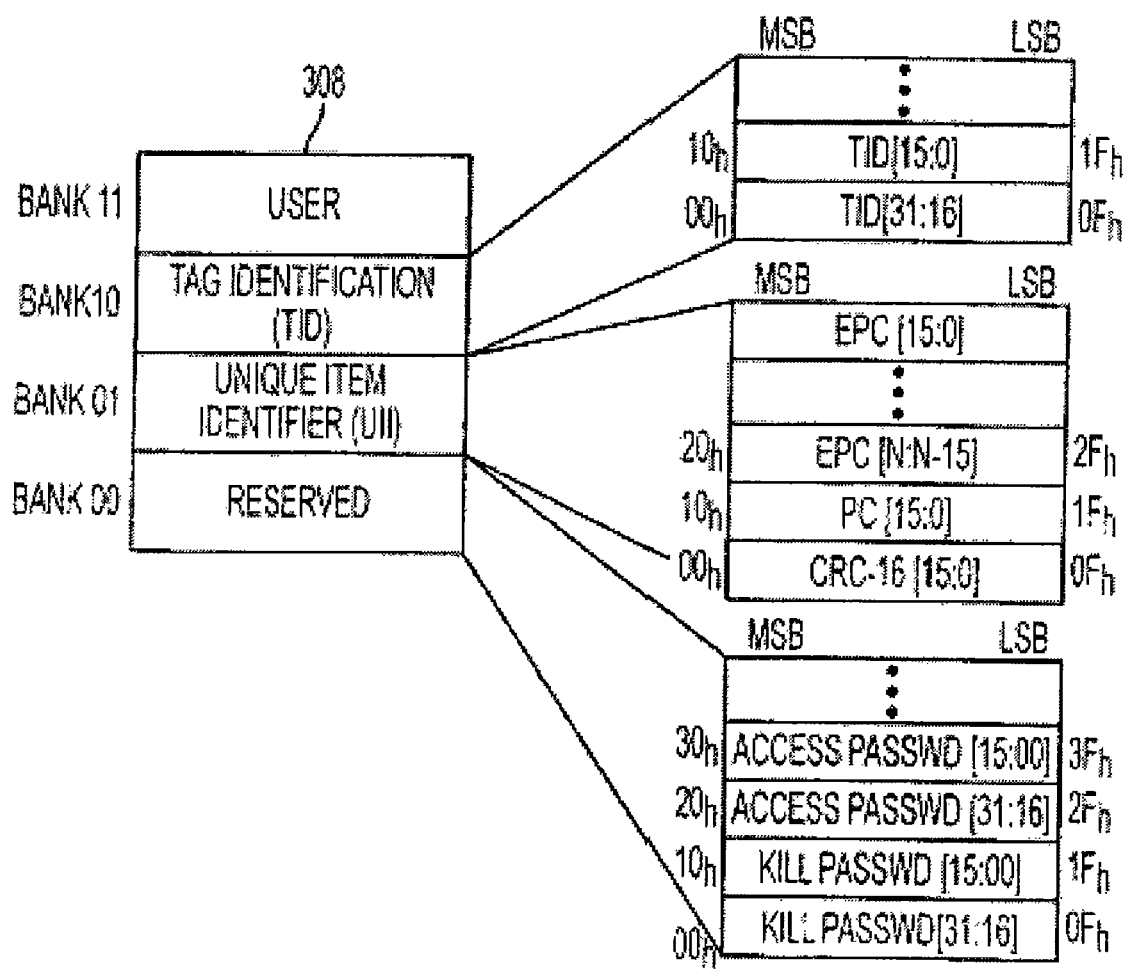

FIG. 4 schematically illustrates a logical memory map for a Gen-2 compliant RFID tag. As shown therein, a tag memory 308 may be logically separated into four distinct banks, each of which may comprise zero or more memory words: a Reserved memory bank, logically designated address '00'; a Unique Item Identifier (UII) memory bank, logically designated address '01'; a Tag Identification (TID) memory bank, logically designated address '10'; and a User memory bank, logically designated address '11'. As shown, in embodiments each of these memory banks stores RFID data in 16-bit (single word) segments, with the most significant bit (MSB) first and the least significant bit (LSB) last. The Reserved memory bank 00 contains kill and access passwords. The Unique Item Identifier (UII) memory bank 01 contains Circular Redundancy Check (CRC), Protocol Control (PC) bits, and an item identifier code (e.g., Electronic Product Code EPC) that identifies the object (item) to which the tag is or will be attached. Typically, each of the PC data and the CRC 16 data is a 16-bit word; the EPC generally is a multiple of 16-bit words, typically 64 or 96 total bits in length. The TID memory bank 10 contains an 8-bit ISO-IEC 15963 allocation class identifier and sufficient identification information for a reader to uniquely identify the custom commands and/or optional features that the tag supports. The User memory bank 11 may contain user-specific data arranged at the user's discretion.

Demodulator 314 is coupled to antenna 304 by antenna signal 328. Demodulator 314 demodulates a radio frequency communication signal (e.g., interrogation signal 110) on antenna signal 328 received from an interrogator by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to an interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

Charge pump 312 is optional. Charge pump 312 may be present in passive or pass-active RFID tags. An active tag, for example, may contain a battery instead of a charge pump.

It will be recognized by persons skilled in the relevant art(s) that tag 102 may include any number of modulators, demodulators, charge pumps, and antennas. Tag 102 may additionally include further elements, including an impedance matching network and/or other circuitry.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. Another example form of a "tag" is a tag inlay that has been attached to another surface, or between surfaces, such as paper, cardboard, etc., for attachment to an object to be tracked, such as an article of clothing, etc.

Example embodiments of the present invention are described in further detail below. Such embodiments may be implemented in the environments, readers, and tags described above, and/or in alternative environments and alternative RFID devices.

Queued Operations

The following section describes methods and systems for the pipelined processing of one or more access commands to a set of RFID tags, such as population 120 of FIG. 1. The Gen-2 standard defines a set of mandatory and optional commands that can be used to access data on an RFID tag. The set of currently defined access commands that write memory includes the Write, Kill, Lock, BlockWrite, and BlockErase commands. The Write command (mandatory) allows an interrogator to write a word in the tag's reserved, UII, TID, or user memory. The Kill command (mandatory) allows the interrogator to permanently disable a tag. The Lock command (mandatory) allows the interrogator to lock or permalock an individual password or an individual memory block. The BlockWrite command (optional) allows an interrogator to write multiple words in the tag's reserved, UII, TID, or user memory. The BlockErase command (optional) allows an interrogator to erase multiple words in the tag's reserved, UII, TID, or user memory.

After issuing one of these commands, the interrogator transmits a CW signal for a predefined time period (e.g., the lesser of 20 ms or the time between the issued command and the tag's reply). The tag's reply may include an indication that the command completely successfully or may include an error code. Alternatively, if the interrogator does not receive a reply within the maximum defined time period, the interrogator may reissue the command.

Figure 5:
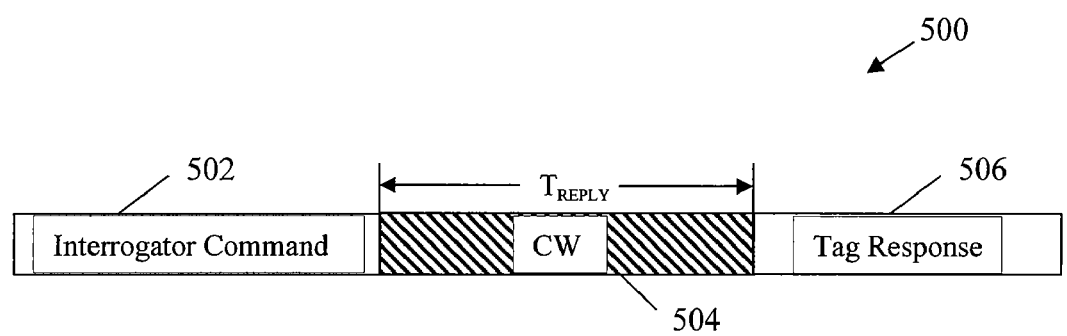
FIG. 5 illustrates a command sequence of an exemplary command.

FIG. 5 shows a successful command sequence 500. Command sequence 500 includes an interrogator command portion 502, a continuous wave (CW) portion 504, and a tag response portion 506. Command portion 502 includes the time period associated with the issuance of the interrogator command (e.g., Write, Kill, BlockWrite, etc.). The duration of the CW portion 504 is the lesser of 20 ms or the time between issuance of the command and the tag's reply. The duration of the CW portion 504 includes the time required for the tag to process the operation associated with the received command (e.g., write a word to memory). Tag response portion 506 includes the time period associated with transmission of the response from the tag to the interrogator.

The CW portion 504 of the command sequence may be significantly longer than the interrogator portion 502 or tag response portion 506. For example, the CW portion may be up to 20 ms (particularly with the BlockWrite and BlockErase commands) whereas the interrogator command portion may be only 1 ms and the tag response duration may be as short as 0.1 ms. A bulk of command sequence 500 is thus the CW portion 504. In applications where the reader must write data to a large population of tags, the time during which the interrogator is effectively waiting (i.e., during CW portion 504) severely impacts the throughput and performance of the interrogator. Thus, the queued approach described herein provides significant improvement to the performance of access operations to large populations of tags. A large population of tags includes tag populations having more than 25 tags. However, as would be appreciated by persons of skill in the art, embodiments of the present invention can work with populations of tags having less than 25 tags.

Figure 6:
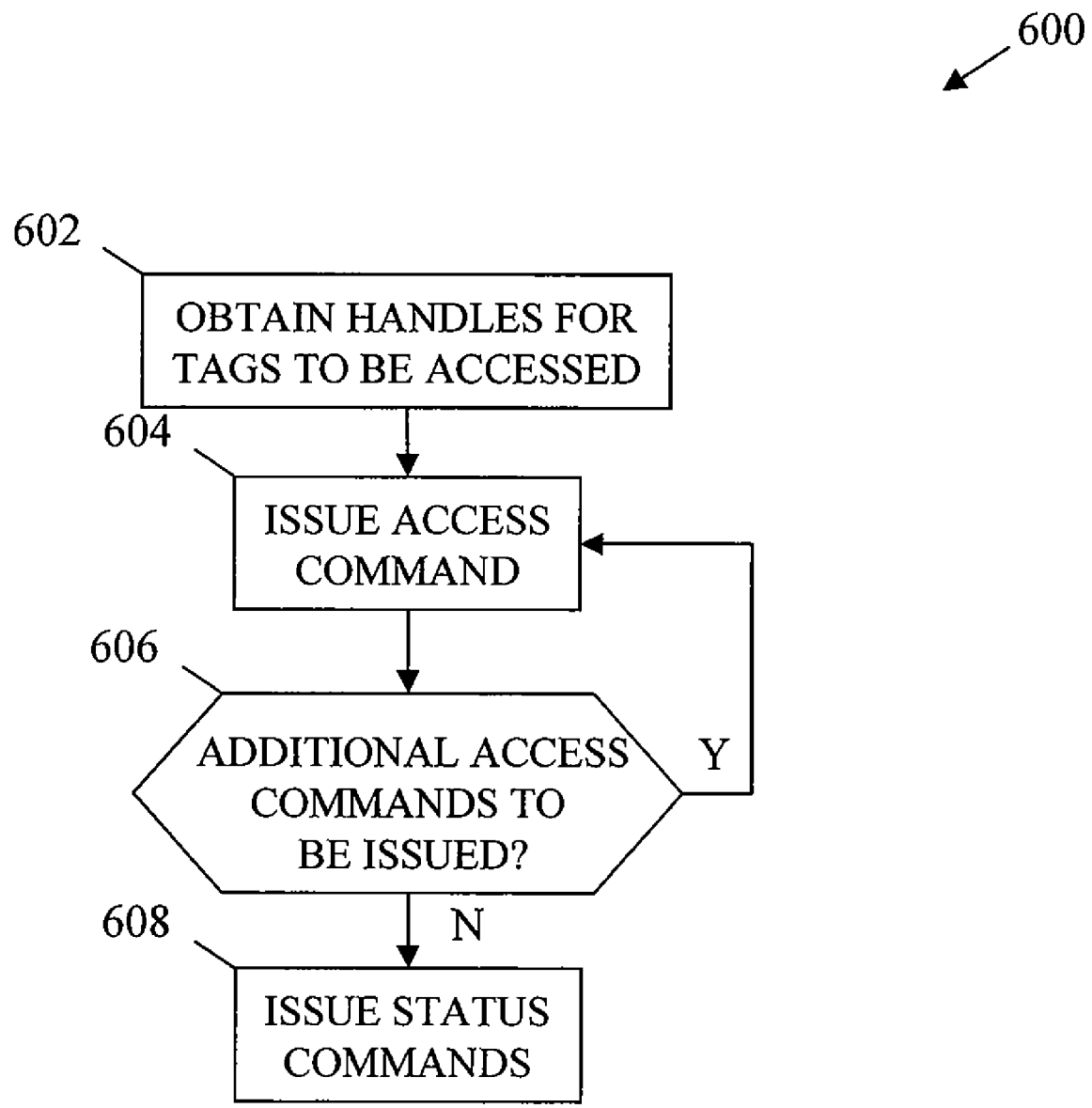
FIG. 6 shows a flowchart providing example steps for pipelined processing of access commands that write memory, according to an embodiment of the present invention.

FIG. 6 shows a flowchart 600 providing example steps for pipelined processing of access commands that write memory, from the perspective of an interrogator, according to embodiments of the present invention. The steps shown in FIG. 6 do not necessarily have to occur in the order shown.

In step 602, handles for tags that will be accessed are obtained. This step is optional. A handle is a random number or a pseudorandom number generated by the tag for use in a series of interactions with an interrogator. All access commands issued to a tag include the tag's handle as a parameter. The handle value is fixed for the entire duration of a tag access. Thus, the handle helps prevent unauthorized access to the contents of a tag memory. Obtaining a handle prior to transmitting access commands may help to avoid misinterpretation of commands that are issued later. Moreover, it is the responsibility of the interrogator to obtain a unique handle from each tag that will receive queued access commands before the queued access commands are issued.

For example, a normal status response from a Write (or Block_Write) may collide with other activity in the forward and backscatter links. This is not likely to disturb a forward link transmission, but could corrupt a backscatter response. Query session commands could be misinterpreted when a tag re-enters the session after "dropping out" to perform the Write command. If this happens the tag may return to Arbitrate state and would need to be singulated again with a new handle before issuing a Write_Status command to determine the status of the prior write. Thus, obtaining the handle for all tags to be written prior to issuing any queued access commands is desirable.

In step 604, a queued access command is issued. A queued access command causes a receiving tag to perform an operation (e.g., writing a word to memory) and to ignore any further transactions until a subsequent status request command is received. In a queued command the receiving tag does not transmit (e.g., backscatter) status information upon completion of the operation. Tags are prevented from automatically transmitting status information because such a transmission may interfere with other activity in the RFID network. For example, an automatic status transmission may interfere with a command issued by a reader or status responses transmitted by other tags. Moreover, queued commands also ensure that the receiving tag ignores all commands received until an associated status request command is received. This prevents the receiving tag from misinterpreting transmissions from the reader, which may cause the tag to enter a state in which status information cannot be requested (e.g., the Arbitrate state in the Gen-2 specification).

Queued access commands may be optional or custom commands. A custom command is transmitted to a tag after the tag has been singulated and its Tag manufacturer's identification has been obtained (e.g., read from the tag's TID memory). Therefore, these steps are assumed to have occurred prior to step 604. The interrogator and the tag both must support the queued access command.

FIGS. 7A-7C depict exemplary formats 700 for queued Write, BlockWrite, and BlockErase commands, according to embodiments of the present invention. Each queued access command includes the command name, the tag handle, and a cyclic redundancy check field. In an embodiment, a first set of bits of the command name identify the command as a custom command and a second set of bits identifies the specific custom command.

The Queued_Write, Queued_BlockWrite, and Queued_BlockErase commands also include a memory bank identifier and an address pointer. The memory bank field identifies the memory bank to be accessed by the operation. The address pointer (WordPtr) field specifies the address (e.g., the starting address) for the access operation. In an embodiment, bits in the WordPtr field may use EBV formatting. The Queued_Write and Queued_BlockWrite commands include the data to be written. In the Queued_Write command, the data may be exclusive OR'd with a random number. The Queued_BlockWrite and Queued_BlockErase commands include an indication of the number of words to write or erase.

As would be appreciated by persons of skill in the art, other queued access commands (e.g., Lock, Read_Lock, Kill) may include a different set of elements. However, each queued access command must include the command name and the tag handle.

In step 606, it is determined whether additional access commands are to be issued. For example, an interrogator may opt to issue access commands to each tag of an identified population. Alternatively, an interrogator may opt to issue access commands to a portion of an identified tag population. If it is determined that additional access commands are to be issued, operation returns to step 604. If it is determined that additional access commands are not to be issued, operation proceeds to step 608.

In step 608, one or more status request commands (e.g., Write_Status) are issued. A status request command requests status information relevant to an operation performed on a tag in response to the command that was transmitted in step 604. A status request command may be an optional or custom command. For example, for a QUEUED_WRITE command, the status request command causes the tag to transmit (e.g., backscatter) a response that indicates whether the write operation was successful or unsuccessful, or that the tag is busy completing an operation. Upon receipt of a status request command, the tag returns to normal operation.

In the embodiment described in FIG. 6, status request commands are issued after all of the access commands have been issued. However, in alternate embodiments, status request commands may be issued before all of the access commands have been issued. For example, and without limitation, an RFID network may be implemented as a spread spectrum system. For example, in such an embodiment, the interrogator may be required to hop to another frequency after a given time, i.e., a maximum dwell time, (e.g., every 400 ms as required by the Federal Communications Commission (FCC)). In such an embodiment, the interrogator may issue status request commands for all queued commands issued while the interrogator has dwelled at a current frequency before hopping to another frequency. Thus, even if all of queued access commands have not been transmitted, status request commands may have to be transmitted before the interrogator hops to another frequency.

As discussed above, multiple words are written using the Queued_BlockWrite command. However, in alternate embodiments, large blocks of data may also be written using scratchpads that temporarily hold data to be written. In such an embodiment, one or more scratchpads would hold data to be written and receiving tags would implement extended store cycles (e.g., longer than 20 ms) that can be used to store larger blocks of words.

The use of queued access commands, where the targeted tags will proceed with the commanded write operation but ignore further transactions until they have been requested to provide status from previous queued access command (e.g., Write_Status) allows the tag writing process to be parallelized which results in up to a 10× performance improvement. This method allows for more than 500 word writes (or multi-word, if applicable) per second, regardless of the target tag write speed (even if the tag requires more than 20 ms store time).

In an embodiment, the status request command (e.g., Write_Status) command is used by itself. The status request command provides a mechanism to recover the status of a previous Write command in the event that the status was missed for any reason, without requiring the full write sequence to be re-performed. Additionally, it may allow the ability to perform queued write functionality with some minimal complications.

Figure 8:
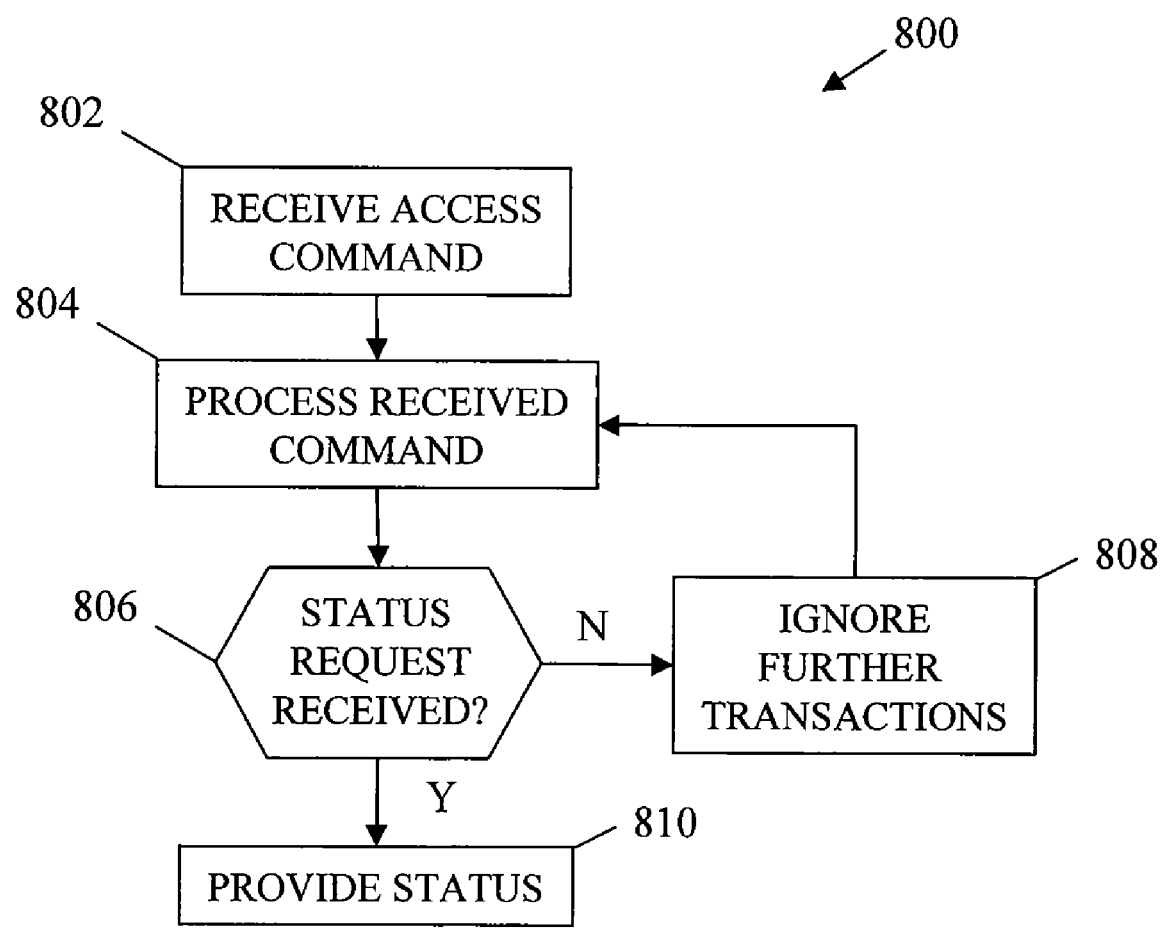
FIG. 8 shows a flowchart providing example steps for pipelined processing of access commands that write memory, for the perspective of a tag, according to an embodiment of the present invention.

FIG. 8 shows a flowchart 800 pipelined processing of access commands that write memory, from the perspective of a tag, according to embodiments of the present invention. Note that the steps shown in FIG. 8 do not necessarily have to occur in the order shown.

In step 802, a queued access command is received. For example, the command may be a Queued_Write, Queued_BlockWrite, or a Queued_BlockErase command.

In step 804, the received command is processed. If the queued access command is a Queued_Write command, the specified write operation is performed.

In step 806, it is determined if a status request command is received. If the status request command is not received, operation proceeds to step 808. If the status request command is received, operation proceeds to step 810.

In step 808, the tag suspends processing of any commands or transaction requests from an interrogator (or other external source) until a status request command is received. This is in contrast to processing of a standard write command. In standard write command processing, the tag would transmit a reply to the received command upon completion of processing.

In step 810, a response to the status request command is transmitted (e.g., backscattered) that provides the status of the operation associated with the received access command. If the received access command was a Queued_Write command, the response may indicate whether the associated write operation was successful, unsuccessful, or that the tag is still processing the request. Thus, in an embodiment, a response may indicate that the tag is still processing the request. However, such a response requires the tag to expend energy to transmit (e.g., backscatter) a response. Therefore, in an alternate embodiment, the tag may wait until the success or failure of the write operation is determined before transmitting a response. In an embodiment, the response to the status request command may have a structure substantially similar to a response that is automatically transmitted after a Write (i.e., not Queued_Write) command has been processed.

Figure 9:
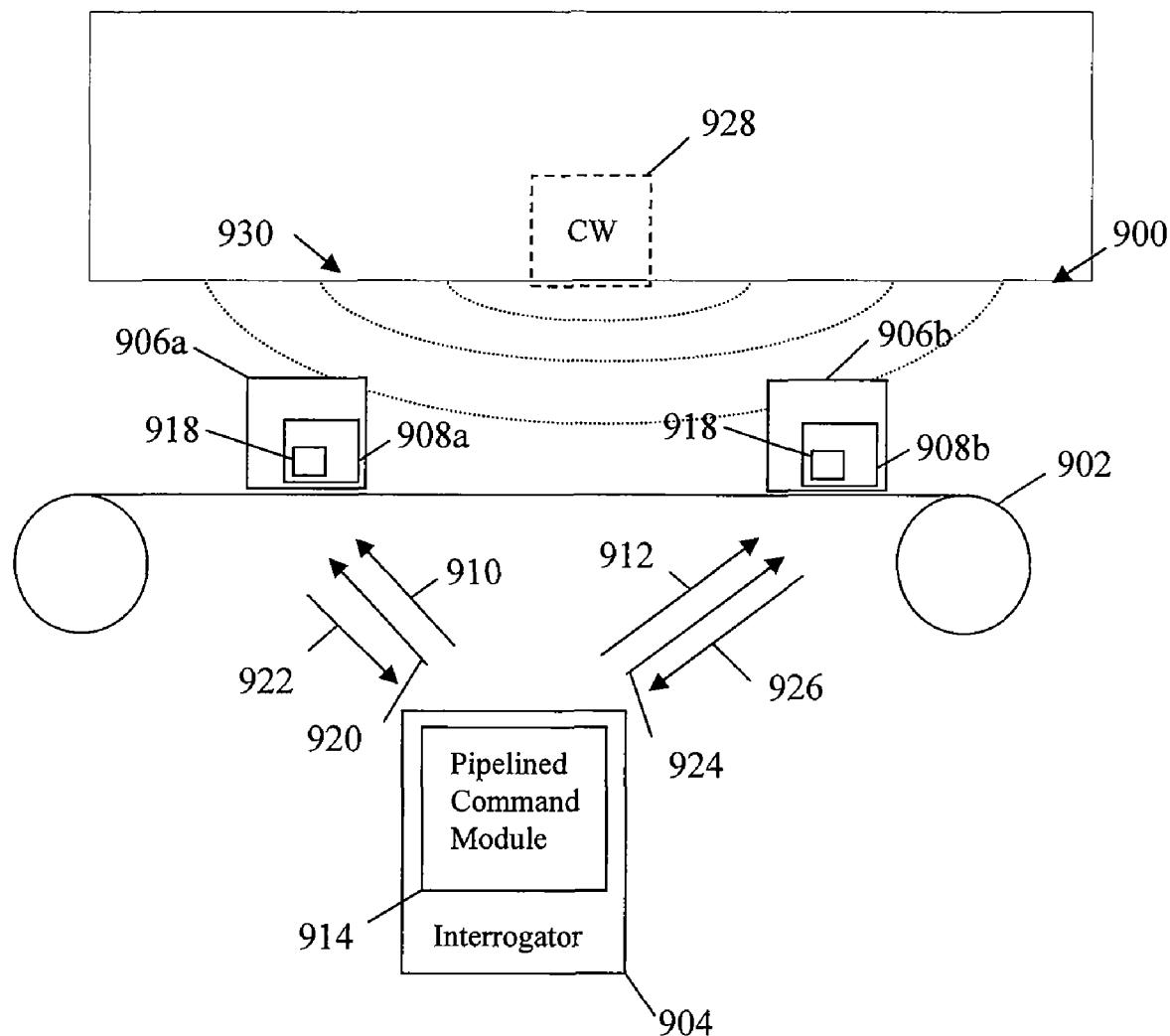
FIG. 9 shows an exemplary operating environment having a system for pipelined processing of access commands, according to an example embodiment of the present invention.

FIG. 9 shows an exemplary operating environment having a system for pipelined processing of access commands, according to embodiments of the present invention. Operating environment 900 includes a conveyor belt 902 for moving items within a location, an interrogator 904, and a plurality of items 906a and 906b. Tags 908a and 908b are affixed to items 906a and 906b, respectively.

Interrogator 904 includes a pipelined access command module 914. Pipelined access command module 914 is configured to schedule and issue queued access commands to an identified population of tags. Pipelined command module 914 is further configured to issue status request commands to previously accessed tags.

Tags 908a and 908b include a queued access command module 918. Queued access command module 918 is configured to process received queued access commands. Tags 908a and 908b may be active or passive tags. For example, tags 908a and/or 908b may be substantially similar to tag 102 described with reference to FIGS. 1, 3, and 4.

As items travel across conveyor belt 902, interrogator 904 communicates commands to tags affixed to the items. For example, interrogator 904 transmits a queued access command 910 that is received by tag 908a affixed to item 906a. Tag 908a processes the queued access command and suspends processing of commands and/or transaction requests until receipt of a status request command.

Instead of waiting for a response to queued access command 910, interrogator 904 transmits a second queued access command 912 that is received by tag 908b before tag 908a completed an operation associated with command 910 (e.g., writing a word to memory). This process may continue for a set of tags moving across the conveyor belt. After the queued access commands are issued, interrogator 904 then issues a first status request command 920 to one of the set of tags. First status request command 920 requests status information relevant to the operation performed by tag 908a in response to command 910. In response, tag 908a transmits (e.g., backscatters) a response 922. Response 922 includes status information relevant to the operation performed in response to command 910 (e.g., the status of a write operation). Similarly, interrogator 904 also transmits a second status request command 924 that requests status information relevant to an operation performed in response to command 912 and receives a response 926 that includes the requested status information.

Thus, by issuing commands in a queued manner, interrogator 904 does not have to wait for tag 908a to finish processing command 910 before transmitting command 912. In such a manner, the CW portion 504, described with reference to FIG. 5, may be used by a interrogator to issue other commands rather than waiting for a response from a tag.

System 900 also optionally includes a CW transmitter 928. Although depicted as separate from interrogator 904, CW transmitter 928 may be integrated with the interrogator 904. CW transmitter 928 transmits a CW 930 that may be used to power tags 908a and 908b. For example, in the embodiment in which tag 908a is a passive tag, CW 930 provides necessary power so that tag 908a is able to backscatter response 922 and/or perform other functions. The addition of a CW transmitter 928, then, effectively frees interrogator 904 from the task of transmitting CW that may be used to power tags 908a and/or 908b.

Figure 10:
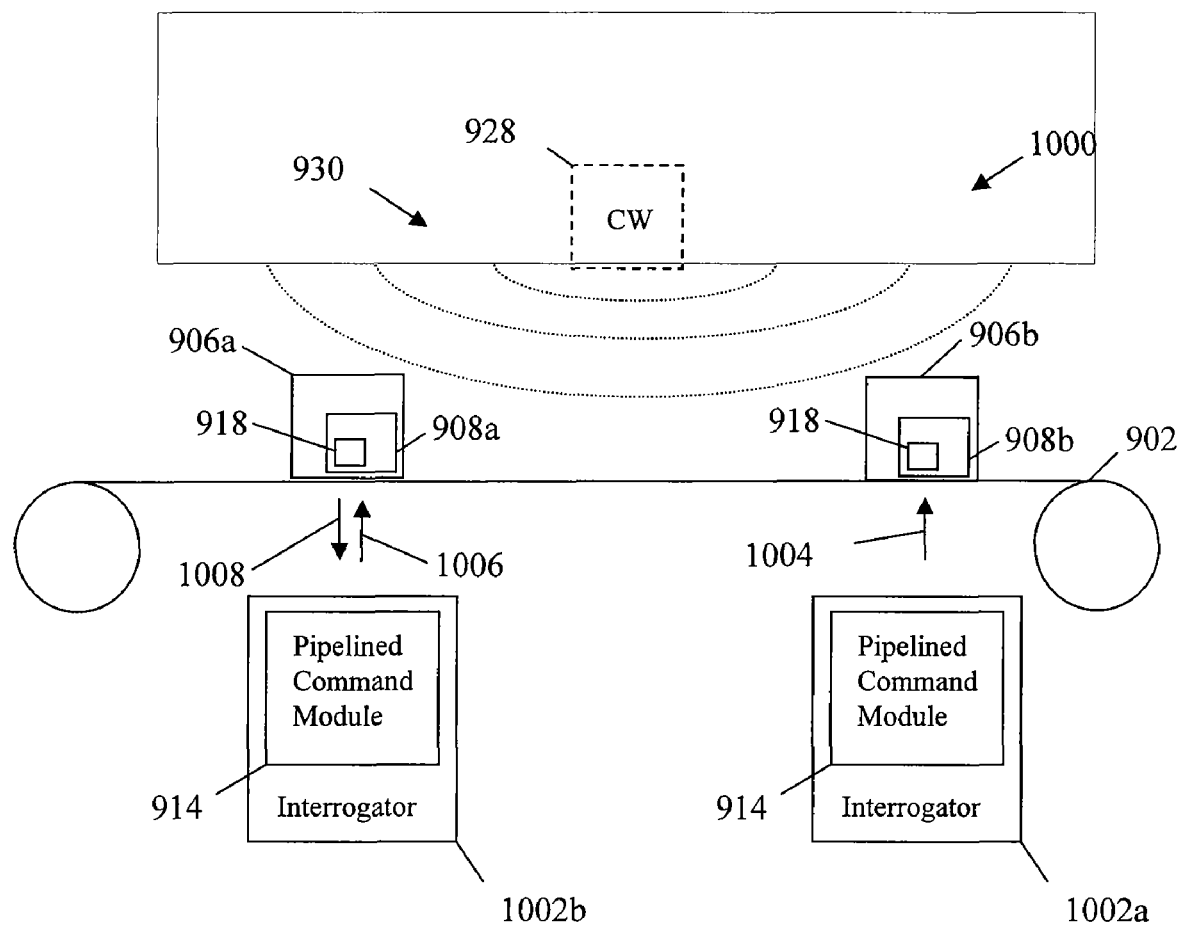
FIG. 10 shows another exemplary operating environment having a system for pipelined processing of access commands, according to an example embodiment of the present invention.

FIG. 10 shows another exemplary operating environment having a system for pipelined processing of access commands, according to embodiments of the present invention. System 1000 is generally similar to system 900 described with reference to FIG. 9, however, system 1000 includes two interrogators 1002a and 1002b instead of one interrogator (i.e., interrogator 904). Interrogator 1002a is configured to issue queued access commands 1004 (e.g., Queued_Access) while interrogator 1002b is configured to issue the status request commands 1006 that correspond to queued access commands 1004. Interrogator 1002a has a relatively high throughput because it does not have to wait for a tag to process a command 1004 before issuing a second command. Thus, interrogator 1002a may be able to issue commands 1004 at a rate largely independent of the processing capabilities of the receiving tags.

Figure 11:
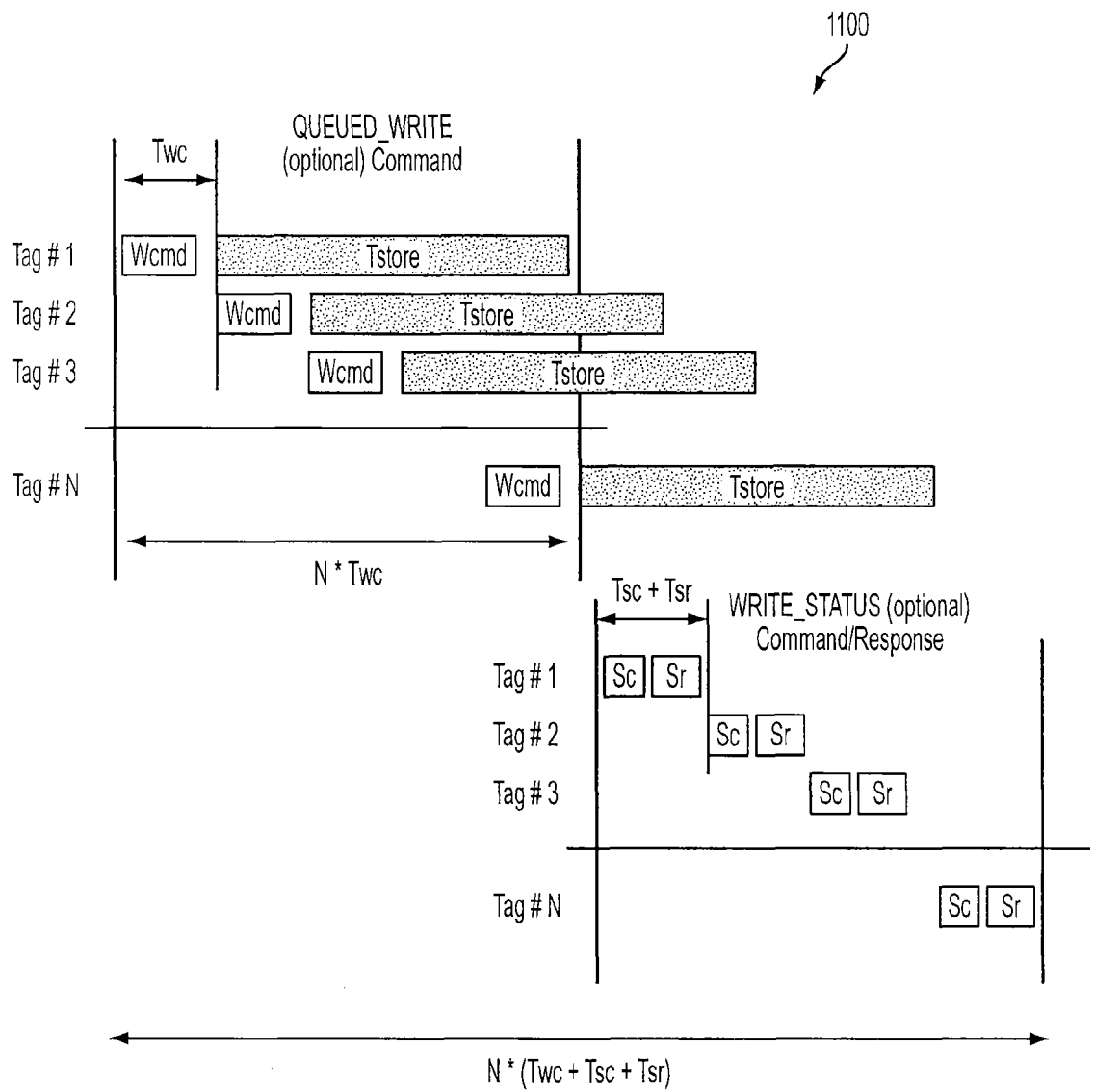
FIG. 11 shows a timing diagram illustrating pipelined processing of queued write commands to a population of tags, according to an example embodiment of the present invention.

FIG. 11 shows a timing diagram 1100 illustrating pipelined processing of queued write commands to a population of tags (1-N). As shown in FIG. 11, a Queued_Write command is transmitted to each member of the tag population sequentially. Transmission of a Queued_Write command takes a time, Twc. In the embodiment in which a Type A Reference Interval (Tari) is equal to 6.25 μs and the backscatter link frequency is 465 kbps, Twc may be equal to 1 ms. After a Queued_Write command is received, the receiving tag will spend a time Tstore writing the desired value to memory. In an embodiment, Tstore may be equal to 20 ms. As shown in diagram 1100, an interrogator can issue a command prior to receiving a reply to previously issued command. For example, a command is transmitted to Tag #3 before Tag #1 and Tag #2 have completed write operations associated with earlier Queued_Write commands. If commands are overlapped, the time typically spent waiting for a tag response (Tstore) can be used to issue write commands to other tags in the population. In normal write operation, this time (Tstore) can represent up to 90% (or more) of the time required to perform the desired write operation.

After all (or a set) of the Queued_Write commands have been transmitted, the interrogator transmits WRITE_STATUS commands to each tag of the tag population. In an embodiment, it takes a time Tsc to transmit and receive a WRITE_STATUS command and a time Tsr to transmit (e.g., backscatter) and receive a response to the WRITE_STATUS command. In an embodiment, Tsc may be equal to 0.5 ms and Tsr may be equal to 0.1 ms.

The process of interrogator 904 sending new queued access commands instead of a CW signal during the Tstore time period may reduce the effective received power by the tag. This may result in a slightly reduced write distance when using queued access commands. Therefore, an optional CW transmitter 928 may be provided to provide a power signal to the tags.

For a population of N tags, then, the total time needed to write values to each tag of the tag population and confirm status of the write operations, assuming each write is successful, in a queued manner is equal to N*(Twc+Tsc+Tsr), where N is the number of tags in the tag population. In the embodiment in which the write commands are not queued, writing values to each tag of the tag population, again assuming each write is successful, is equal to N*(Twc+Tstore+Tsr). Thus, the time saved by queuing write commands may be equal to N(Tstore−Tsc). For the values described above, the time saved would be equal to 19.5*N ms. Expressed alternatively, the use of pipelined commands can increase the throughput of a reader by 10 times for a Tstore of 20 ms or by 6 times for a Tstore of 10 ms. As would be apparent to those skilled in the relevant art(s), the use of queued block type commands also results in an increase in throughput compared to non-queued sequential block type commands.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for pipelined processing of access commands to a population of radio frequency identification (RFID) tags, comprising:
at an interrogator:
transmitting a first queued access command to a first tag in the population of RFID tags, wherein the first queued access command causes the first tag to perform a write operation and upon completion of the write operation, to suspend transaction processing indefinitely until a status request command is received;
transmitting a second queued access command to a second tag in the population of RFID tags, wherein the second queued access command is transmitted while the first tag is performing the command operation; and
transmitting the status request command to the first tag, wherein the status request command causes the first tag to resume normal processing.

2. The method of claim 1, further comprising:
prior to transmitting a first queued access command, negotiating a handle for each tag in a set of tags in the population of RFID tags.

3. The method of claim 1, wherein the first queued access command is a QueuedWrite command.

4. The method of claim 1, wherein the first queued access command is a QueuedBlockWrite command.

5. The method of claim 1, wherein the first queued access command is a QueuedBlockErase command.

6. The method of claim 1, further comprising:
transmitting a continuous wave (CW) signal to the population of RFID tags simultaneously with transmitting the first queued access command and the second queued access command.

7. The method of claim 1, wherein the population of tags includes more than 25 tags.

8. A method for pipelined processing of access commands to a population of radio frequency identification (RFID) tags, comprising:
at a RFID tag:
receiving a queued access command defining a write operation;
performing the write operation in response to the first command; and
upon completion of the write operation, indefinitely suspending processing of transactions comprising all transmissions from the RFID tag until receiving a subsequent command to resume normal processing.

9. The method of claim 8, further comprising:
receiving a status request command; and
resuming normal operations.

10. The method of claim 8, wherein the queued access command is a QueuedWrite command.

11. The method of claim 8, wherein the queued access command is a QueuedBlockWrite command.

12. The method of claim 8, wherein the queued access command is a QueuedBlockErase command.

13. The method of claim 8, further comprising:
generating a pseudorandom number; and
transmitting the pseudorandom number to an interrogator, wherein the pseudorandom number is used as a handle for subsequent commands.

14. An interrogator for pipelined processing of access commands to a population of radio frequency identification (RFID) tags, comprising:
means for sequentially transmitting queued access commands to a set of tags in the population of RFID tags, wherein a queued access command causes a tag to perform a write operation and upon completion of the write operation, to indefinitely suspend transaction processing comprising all transmissions from the tag; and
means for sequentially transmitting status request commands to the set of tags in the population of RFID tags, wherein a status request command causes a tag to resume normal processing.

15. The interrogator of claim 14, further comprising:
means for negotiating a handle for each tag in the set of tags in the population of RFID tags.

16. The interrogator of claim 14, wherein the queued access command is a QueuedWrite command.

17. The interrogator of claim 14, wherein the queued access command is a QueuedBlockWrite command.

18. The interrogator of claim 14, wherein the queued access command is a QueuedBlockErase command.

19. The interrogator of claim 14, further comprising:
means for transmitting a continuous wave (CW) signal to the population of RFID tags simultaneously with transmitting the queued access commands.

20. A method for pipelined processing of access commands to a population of radio frequency identification (RFID) tags, comprising:
sequentially transmitting a plurality of queued access commands to the population of RFID tags, wherein each of the plurality of queued access commands define a write operation to a tag and instructs the tag to perform the write operation and to suspend all transmissions thereafter indefinitely until a status request command is subsequently received, wherein each queued access command following an initial queued access command is transmitted prior to receipt of a reply to an immediately prior queued access command; and sequentially transmitting a plurality of status request commands to the population of RFID tags.

21. The method of claim 20, wherein the population of tags includes more than 25 tags.

\* \* \* \* \*

UNITED STATES PATENT AND TRADEMARK OFFICE
CERTIFICATE OF CORRECTION

| | | |
|---|---|---|
| PATENT NO. | : 7,884,702 B2 | Page 1 of 2 |
| APPLICATION NO. | : 11/956602 | |
| DATED | : February 8, 2011 | |
| INVENTOR(S) | : Drago et al. | |

It is certified that error appears in the above-identified patent and that said Letters Patent is hereby corrected as shown below:

In Column 2, Line 39, delete "queued write" and insert -- Queued_Write --, therefor.

In Column 2, Line 50, delete "EMBODIMENTS" and insert
-- THE EMBODIMENTS --, therefor.

In Column 4, Line 2, delete "a antenna" and insert -- an antenna --, therefor.

In Column 5, Line 41, delete "FMO" and insert -- FM0 --, therefor.

In Column 9, Lines 36-37, delete "queuedWrite" and insert -- Queued_Write --, therefor.

In Column 12, Line 43, delete "queued write" and insert -- Queued_Write --, therefor.

In Column 13, Line 65, in Claim 3, delete "QueuedWrite" and
insert -- Queued_Write --, therefor.

In Column 13, Line 67, in Claim 4, delete "QueuedBlockWrite" and
insert -- Queued_BlockWrite --, therefor.

In Column 14, Line 2, in Claim 5, delete "QueuedBlockErase" and
insert -- Queued_BlockErase --, therefor.

In Column 14, Line 26, in Claim 10, delete "QueuedWrite" and insert
-- Queued_Write --, therefor.

In Column 14, Line 28, in Claim 11, delete "QueuedBlockWrite" and
insert -- Queued_BlockWrite --, therefor.

Signed and Sealed this
Eighth Day of January, 2013

David J. Kappos
*Director of the United States Patent and Trademark Office*

CERTIFICATE OF CORRECTION (continued)
U.S. Pat. No. 7,884,702 B2

In Column 14, Line 30, in Claim 12, delete "QueuedBlockErase" and insert -- Queued_BlockErase --, therefor.

In Column 14, Line 53, in Claim 16, delete "QueuedWrite" and insert -- Queued_Write --, therefor.

In Column 14, Line 55, in Claim 17, delete "QueuedBlockWrite" and insert -- Queued_BlockWrite --, therefor.

In Column 14, Line 57, in Claim 18, delete "QueuedBlockErase" and insert -- Queued_BlockErase --, therefor.